United States Patent
Lo et al.

(10) Patent No.: US 11,423,338 B2
(45) Date of Patent: Aug. 23, 2022

(54) COMPUTER-BASED SYSTEMS CONFIGURED FOR AUTOMATICALLY SETTING MODIFICATION TRIGGER EVENTS IN RECORDS OF REMOTE DATABASES TO RECEIVE AUTOMATIC DATA UPDATES

(71) Applicant: Capital One Services, LLC, McLean, VA (US)

(72) Inventors: Jessica Lo, McLean, VA (US); Jianshi Zhao, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 109 days.

(21) Appl. No.: 16/710,268

(22) Filed: Dec. 11, 2019

(65) Prior Publication Data
US 2021/0182741 A1    Jun. 17, 2021

(51) Int. Cl.
| | |
|---|---|
| *G06Q 10/00* | (2012.01) |
| *G06Q 10/02* | (2012.01) |
| *G06Q 20/40* | (2012.01) |
| *G06Q 20/34* | (2012.01) |
| *G06F 16/23* | (2019.01) |

(52) U.S. Cl.
CPC ......... *G06Q 10/02* (2013.01); *G06F 16/2379* (2019.01); *G06Q 20/34* (2013.01); *G06Q 20/401* (2013.01)

(58) Field of Classification Search
None
See application file for complete search history.

(56) References Cited

U.S. PATENT DOCUMENTS

| | | |
|---|---|---|
| 2002/0007330 A1 | 1/2002 | Kumar et al. |
| 2002/0077978 A1 | 6/2002 | O'Leary et al. |
| 2007/0052517 A1 | 3/2007 | Bishop et al. |
| 2009/0094118 A1 | 4/2009 | Antonucci et al. |
| 2012/0053969 A1 | 3/2012 | Schukraft |

OTHER PUBLICATIONS

International Search Report and Written Opinion from International Application No. PCT/US20/64177 dated Mar. 3, 2021.

*Primary Examiner* — Tonya Joseph
(74) *Attorney, Agent, or Firm* — Greenberg Traurig, LLP

(57) ABSTRACT

A method may include receiving, by at least one processor associated with a financial institution, a purchase transaction information of a purchase of at least one airline ticket from a flight booking database. The purchase transaction information may be associated with an account of a payment card issued by a financial institution. A travel advisory may automatically be applied to the account of the payment card based on a first destination location and a first departure date of the at least one airline ticket. The at least one processor may establish an airline reservation modification trigger event in the flight booking database and may receive the modified airline reservation information from the flight booking database when the airline reservation information was modified. The travel advisory may be updated for the account of the payment card issued by the financial institution in accordance with the modified airline reservation information.

20 Claims, 9 Drawing Sheets

— 125

— 130

Credit Card Account Number: XXXXX-XXXXX-XXXXX-1234

Account Owner Name: JOHN M. SMITH
Address: 123 Any Street, Any City, NY 10059
Credit Line: $20,000
Account Balance: $1380.84 as of April 15, 2018

Statement Details – April 2018

4/7/2018 Alitalia $1380.84 — 210
John Smith
AZ561 6/1/2018 JFK/FCO
AZ560 6/17/2018 FCO/JFK \*\*\* Travel Advisory — 200
Country: Italy — 202
Start Date: June 1, 2018 — 204
End Date: June 17, 2018 — 206

— 165

— 170

RECORD LOCATOR: ABCD12
04/07/2018 NEW RESERVATION — 220

PASSENGER NAME: SMITH, JOHN — 225
230
OUTBOUND FLIGHT ⌢ ALITALIA AZ561   JFK/FCO   SEAT 20B
LV    06/01/2018    7:30 PM
NEW YORK JOHN F. KENNEDY INT'L - USA — 232
TERMINAL 3                                            235
AR    06/02/2018    10:10 AM
ROME – LEONARDO DAVINCI -FIUMICINO AIRPORT – ITALY
TERMINAL A     240

INBOUND FLIGHT ⌢ ALITALIA AZ560   FCO/JFK   SEAT 22D
LV    06/17/2018    10:40 AM
ROME – LEONARDO DAVINCI -FIUMICINO AIRPORT – ITALY
TERMINAL A                                            242
AR    06/17/2018    2:15 PM
NEW YORK JOHN F. KENNEDY INT'L - USA — 244
TERMINAL 3

FARE:                              : $  664.00 USD
TAXES, FEES, AND CHARGES  : $  716.84 USD
FLIGHT TOTAL                  : $1380.84 USD — 246

PAID WITH CREDIT CARD XXXX-XXXX-XXXX-1234 — 248

FIG. 2

COMPUTER-BASED SYSTEMS CONFIGURED FOR AUTOMATICALLY SETTING MODIFICATION TRIGGER EVENTS IN RECORDS OF REMOTE DATABASES TO RECEIVE AUTOMATIC DATA UPDATES

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC., All Rights Reserved.

FIELD OF TECHNOLOGY

The present disclosure generally relates to computer-based systems configured for automatically setting modification trigger events in records of remote databases to receive automatic data updates such as, without limitation, data updates of flight booking for executing travel advisory-related software routines.

BACKGROUND OF TECHNOLOGY

A computer network platform/system may include a group of computers (e.g., clients, servers, etc.) and other computing hardware devices (e.g., remote databases) that are linked together through one or more communication channels to facilitate communication and/or resource-sharing, via, for example, application programming interface(s).

SUMMARY OF DESCRIBED SUBJECT MATTER

In some embodiments, the present disclosure provides an exemplary technically improved computer-based method that may include at least the following steps of:
receiving, by at least one processor associated with a financial institution, a purchase transaction information of a purchase of at least one airline ticket from a flight booking database;
where the purchase transaction information may be associated with an account of a payment card issued by a financial institution,
where the purchase transaction information may include airline reservation information for a first departure-destination location pair;
where the airline reservation information may include at least one passenger name, a first departure location, a first destination location, and a first departure date;
automatically applying, by the at least one processor, a travel advisory to the account of the payment card based on the first destination location and the first departure date,
where the travel advisory may authorize a use of the payment card at the first destination location;
causing, by the at least one processor, to establish an airline reservation modification trigger event in the flight booking database;
where the airline reservation modification trigger event may be configured to cause the flight booking database to send modified airline reservation information to the at least one processor associated with the financial institution;
where the modified airline reservation information may include at least one of:
i) a second departure location that is distinct from the first departure location,
ii) a second destination location that is distinct from the first destination location, and
iii) a second departure date that is distinct from the first departure date;
receiving, by the at least processor, the modified airline reservation information from the flight booking database when the airline reservation information was modified; and
updating, by the at least one processor, the travel advisory for the account of the payment card issued by the financial institution in accordance with the modified airline reservation information.

In some embodiments, the present disclosure provides an exemplary technically improved computer-based system that may include at least the following components:
a memory; and
at least one processor configured to:
receive a purchase transaction information of a purchase of at least one airline ticket from a flight booking database;
where the purchase transaction information may be associated with an account of a payment card issued by a financial institution,
where the purchase transaction information may include airline reservation information for a first departure-destination location pair;
where the airline reservation information may include at least one passenger name, a first departure location, a first destination location, and a first departure date;
automatically apply a travel advisory to the account of the payment card based on the first destination location and the first departure date,
where the travel advisory may authorize a use of the payment card at the first destination location;
cause to establish an airline reservation modification trigger event in the flight booking database;
where the airline reservation modification trigger event may be configured to cause the flight booking database to send modified airline reservation information to the at least one processor associated with the financial institution;
where the modified airline reservation information may include at least one of: i) a second departure location that is distinct from the first departure location,
ii) a second destination location that is distinct from the first destination location, and
iii) a second departure date that is distinct from the first departure date;
receive the modified airline reservation information from the flight booking database when the airline reservation information was modified; and
update the travel advisory for the account of the payment card issued by the financial institution in accordance with the modified airline reservation information.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIG. 2 depicts an exemplary initial payment card travel advisory automatically applied to a payment card account when making a flight booking, in accordance with one or more embodiments of the present disclosure;

DETAILED DESCRIPTION

Figure 1:
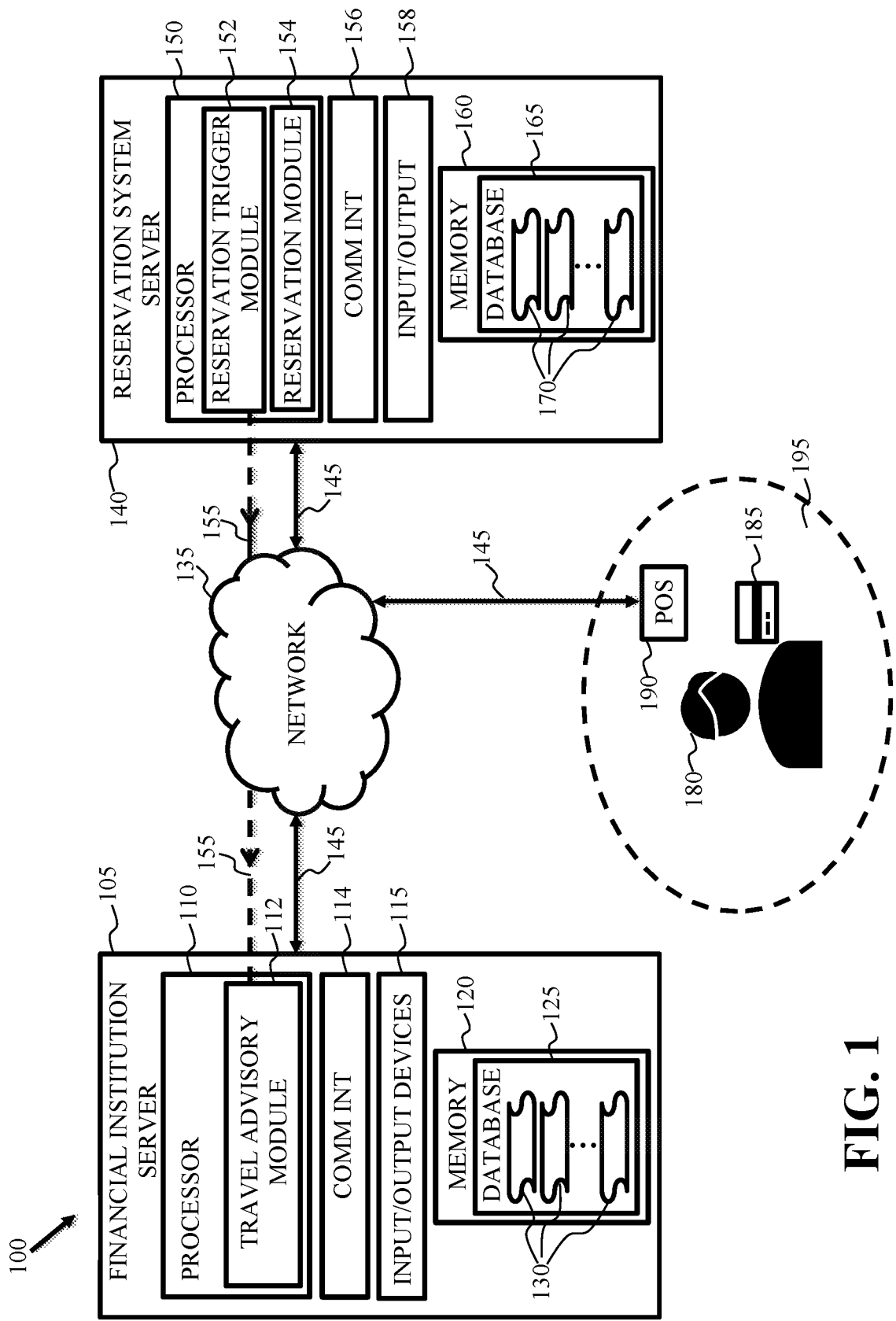
FIG. 1 depicts an exemplary system for automatically applying a travel advisory to payment card accounts when booking flights, in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

Embodiments of the present disclosure herein describe a system and method for automatically applying a travel advisory to payment card accounts when booking flights. When an account owner of a payment card (e.g., a credit card and/or a debit card) uses the payment card to purchase airline tickets in a flight reservation system, a computing system of a financial institution may receive the initial flight reservation information such as the passenger name, departure and/or destination locations, and/or dates of the flights either from the payment card transaction record in the financial institution and/or from the booking record from the flight reservation system.

The computing system may use the initial flight reservation information to apply a travel advisory to the payment card account and/or any other accounts held by the account owner. With the travel advisory in place, if the account owner attempts to use the payment card in purchase transactions at the destination and/or between the flight dates registered in the flight reservation, the payment card will not be blocked as a possible fraudulent purchase transaction typically requiring the account owner to call into the financial institution such as the bank to remove the block.

FIG. 1 depicts an exemplary system 100 for automatically applying a travel advisory to payment card accounts when booking flights, in accordance with one or more embodiments of the present disclosure. System 100 may include a server 105 of a financial institution issuing a payment card 185 to a payment card account owner 180, where financial institution server 105 may communicate 145 with a reservation system server 140 over a communication network 135.

In some embodiments, a travel advisory may be set for when the payment card account owner 180 is located at a remote geographical location 195 such as a foreign country (e.g., a country that payment card account owner 180 may be visiting) that was designated in the flight ticket reservation. Thus, a purchase transaction made by payment card 185 may be approved when the travel advisory is set, for example, at a point-of-sale (POS) terminal 180 located in remote geographical location 195, as POS terminal 180 communicates 145 the attempted purchase transaction with financial institution server 105 via communication network 135 to request purchase transaction approval. Without the travel advisory set, the financial institution server 105 may reject the attempt purchase transaction as a possible fraudulent transaction.

In some embodiments, financial institution server 105 may include a processor 110, input/output devices 115, a memory 120, and communication circuitry and interface 114 for communicating 145 over communication network 135. Processor 110 may configure to execute code of a travel advisory module 112, where the code may be stored in memory 120. Memory 120 may include of an account database 125 storing a plurality of records 130 with account information of account owners of a plurality of accounts issued and/or managed by the financial institution (e.g., payment card accounts—debit and/or credit card accounts, bank accounts, loan accounts, and/or investment account).

In some embodiments, reservation system server 140 may include a processor 150, input/output devices 158, a memory 160, and communication circuitry and interface 156 for communicating 145 over communication network 135. Processor 150 may be configured to execute software code of a reservation module 154 and/or a reservation modification trigger module 154, where the code for these modules may be stored in memory 120. Memory 120 may include of a flight booking database 165 storing a plurality of records 130 with each record including the travel reservation records of a plurality of clients such as passengers. Reservation module 154 may be used to manage all of the flight bookings made by reservation system server 140.

In some embodiments, after a flight reservation stored in record 170 may be initially established upon purchasing the airline ticket using payment card 185 by account owner 180, any changes to the flight record (e.g., changes in flight dates, addition or removal of passengers, changes in flight departure and/or destination locations), detected by processor 150 may cause reservation trigger module 152 to establish an airline reservation modification trigger event in flight booking database 165.

In some embodiments, the airline reservation modification trigger event may cause flight booking database 165 with record 170 with the modified airline reservation information to send or relay 155 the modified airline reservation information to processor 110 (e.g., to travel advisory module 112) associated with the financial institution. In response, travel advisory module 112 may update the travel advisory stored in record 130 of the account of payment card 185 of account owner 180 with the modified airline reservation information as described using the following figures.

In some embodiments, reservation trigger module 152 may include any suitable software routine such as an application programming interface (API), for example, running on processor 150. The API running 150 may be in accordance with financial agreements, for example, previously established between the financial institution managing and/or issuing the payment card and the entity managing the reservation system server 140 such as an airline and/or a travel company for sharing and/or relaying 155 the travel, or flight reservation information.

FIG. 2 depicts an exemplary initial payment card travel advisory 200 automatically applied to a payment card account when making a flight booking, in accordance with one or more embodiments of the present disclosure. Record 170 of a new reservation 220 may be stored in database 165 in memory 160 in reservation system server 140 when account owner 180 purchases airline tickets with purchase card 185.

The exemplary reservation shown in record 170 of new reservation 220 is an airline flight reservation for a passenger named John Smith 225 for an outbound flight from New York's John F. Kennedy Airport 232 to Rome's Leonardo DaVinci-Fiumicino Airport in Italy 235 with a first departure date 230 of a first departure-destination location pair (e.g., New York, USA—Rome, Italy) as shown in FIG. 2. Similarly, record 170 of new reservation 220 indicates a second departure date 240 for an inbound flight back to New York 244 from Rome 242. Record 170 of new reservation 220 may include a purchase price 246 paid with a credit card 248 ending in -1234 (e.g., payment card 185 of account owner 180).

In some embodiments, purchase transaction information 210 from new reservation 220 may be relayed to financial institution server 105 (e.g., over communication network 135) and be registered as record 130 in payment card account of account owner 180. Purchase transaction information 210 may include the same details in new reservation 220 (e.g., passenger name(s), departure and destination locations, and flight dates).

In some embodiments, travel advisory module 112 may be configured to use purchase transaction information 210 in record 130 and/or airline reservation information in record 170 of new reservation 220 which may be relayed to processor 110 over communication network 135, so as to identify that account owner 180 will be in Italy between the dates of Jun. 1, 2018 and Jun. 17, 2018. In response, travel advisory module 112 may then set travel advisory 200 with a country 202 of Italy between a start date 204 of Jun. 1, 2018 and an end date 206 of Jun. 17, 2018.

Figure 3:
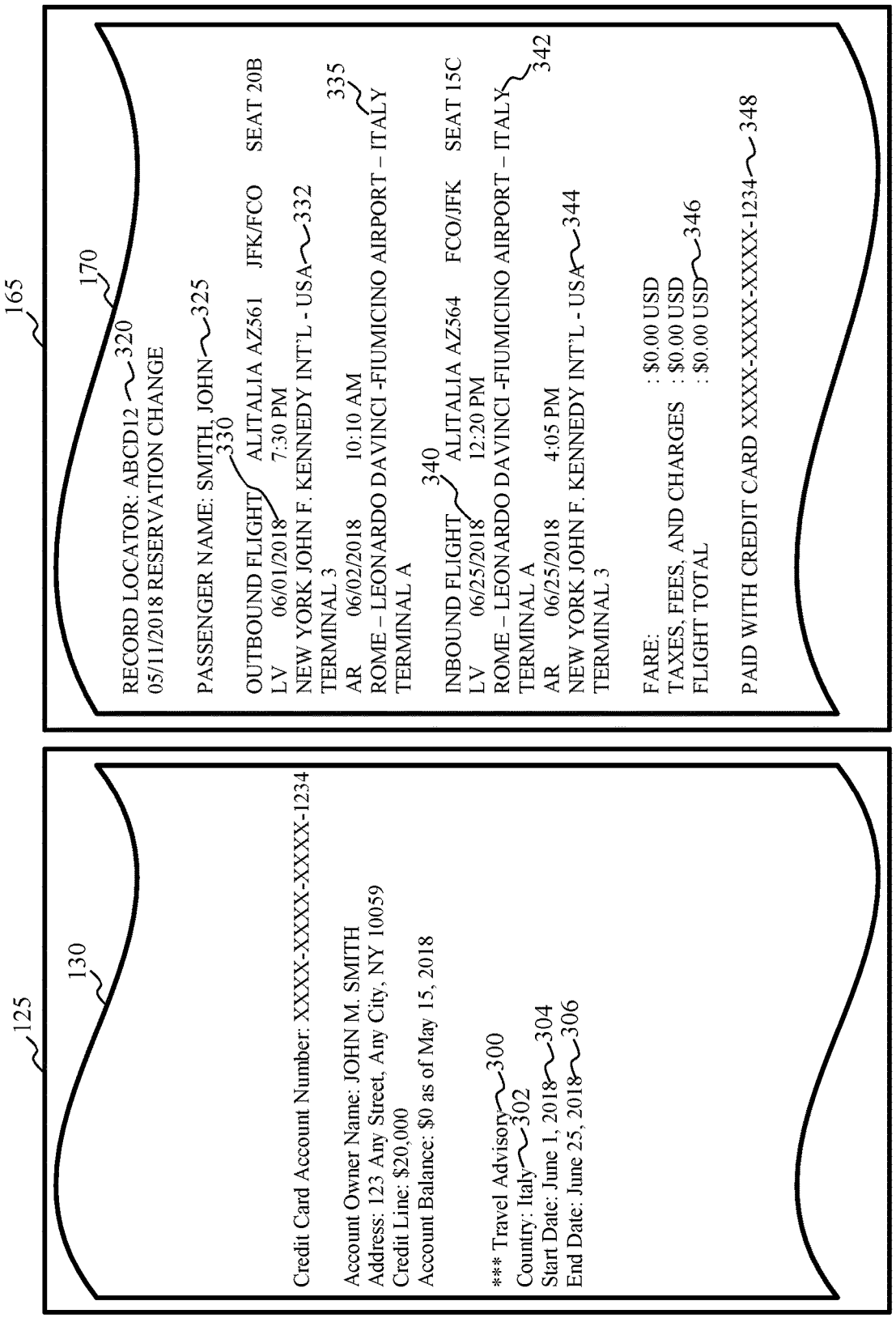
FIG. 3 depicts an exemplary updated payment card travel advisory automatically applied to a payment card account when modifying a flight booking, in accordance with one or more embodiments of the present disclosure.

FIG. 3 depicts an exemplary updated payment card travel advisory 300 automatically applied to a payment card account when modifying a flight booking, in accordance with one or more embodiments of the present disclosure. Record 170 of a reservation change 320 may be stored in database 165 in memory 160 in reservation system server 140 as account owner 180 modifies the airline ticket reservation in reservation system server 140.

The exemplary reservation change shown in FIG. 3 in record 170 of new reservation 220 is an airline flight reservation for a passenger named John Smith 325 for an outbound flight from New York's John F. Kennedy Airport 332 to Rome's Leonardo DaVinci-Fiumicino Airport in Italy 335 with a same departure date (e.g., a departure date 330) of the same departure-destination location pair (e.g., New York, USA—Rome, Italy). Similarly, record 170 of reservation change 320 indicates a second departure date 340 for an inbound flight back to New York 344 from Rome 342. Record 170 of reservation change 320 may include a purchase price 346 of zero with no charge made to a credit card 348 ending in -1234 (e.g., payment card 185 of account owner 180) stored in the database.

In the exemplary reservation change shown in FIG. 3, a change in second departure date 340 of the inbound flight from Jun. 17, 2018 to Jun. 25, 2018 was the only reservation change made on May 11, 2018 compared to the original new reservation made on Apr. 7, 2018 as shown in FIG. 2. No charge was made to the credit card stored in flight booking database 165. Hence, no charge transaction to account of payment card 185 is relayed to financial institution server 105. In this scenario, without the embodiments taught herein, the financial institution would not be aware of reservation change 320 and would not update the travel advisory accordingly.

In the embodiments taught herein, reservation trigger module 152 may be configured to identify reservation change 320 and to send in response, the modified airline reservation information to financial institution server 105. In this manner, travel advisory module 112 operating on processor 110 may receive the modified airline reservation information. Travel advisory module 112 may then may update original travel advisory 200 to updated travel advisory 300 with a country 302 of Italy between a start date 304 of Jun. 1, 2018 and an (updated) end date 306 of Jun. 25, 2018.

The exemplary scenario of a travel reservation for flights between New York and Rome are merely for visual and/or conceptual clarity of the embodiments taught herein, and not by way of limitation of the embodiments disclosed herein. The embodiments may be applied to any purchase of airline ticket reservation including multiple flight dates and multiple destinations to any location. Travel advisory module 112 may apply the travel advisory to each of the multiple locations, even to multiple intermediate locations if there are respective multiple connecting flights to a final destination (e.g., via intermediate stopover locations).

Figure 4:
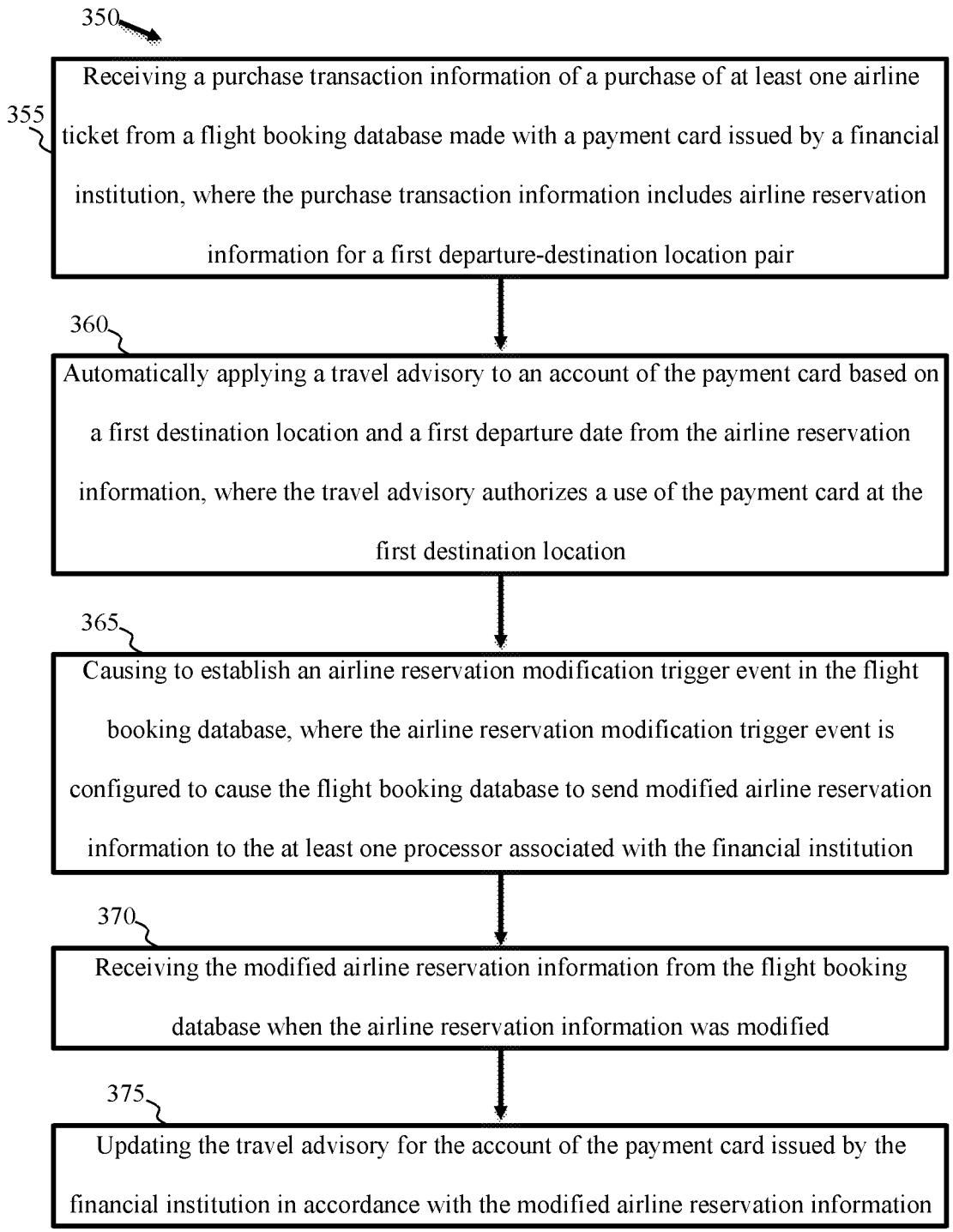
FIG. 4 illustrates a flowchart of an exemplary method for automatically applying a travel advisory to payment card accounts when booking flights, in accordance with one or more embodiments of the present disclosure.

FIG. 4 illustrates a flowchart of an exemplary method 350 for automatically applying a travel advisory to payment card accounts when booking flights, in accordance with one or more embodiments of the present disclosure. Method 350 may be performed, in part, by processor 110 by executing the software code of travel advisory module 112.

Method 350 may include receiving 355 a purchase transaction information of a purchase of at least one airline ticket from a flight booking database made with a payment card issued by a financial institution, where the purchase transaction information includes airline reservation information for a first departure-destination location pair. The airline reservation information may include at least one passenger name, a first departure location, a first destination location, and/or a first departure date.

Method 350 may include automatically applying 360 a travel advisory to an account of the payment card based on a first destination location and a first departure date from the airline reservation information, where the travel advisory authorizes a use of the payment card at the first destination location.

Method 350 may include causing to establish 365 an airline reservation modification trigger event in the flight booking database, where the airline reservation modification trigger event is configured to cause the flight booking database to send modified airline reservation information to the at least one processor associated with the financial institution. In some embodiments, the modified airline reservation information may include at least one of: a second departure location that is distinct from the first departure location, a second destination location that is distinct from the first destination location, and a second departure date that is distinct from the first departure date.

Method 350 may include receiving 370 the modified airline reservation information from the flight booking database when the airline reservation information was modified.

Method 350 may include updating 375 the travel advisory for the account of the payment card issued by the financial institution in accordance with the modified airline reservation information.

In some embodiments, the period of the travel advisory may start from the first departure date of the outbound flight and end on the date of the inbound flight. In other embodiments, the period of the travel advisory may start from the first departure date and end when processor 110 may detect that account owner 180 may be using payment card 185 to perform purchase transactions near to or in the vicinity of a home location of account (e.g., near to the home address registered in the account of account owner 180).

In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other. Communication circuitry and interface 114 and 156 may be configured to communicate using any of the above-mentioned data communication protocols/modes.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a tweet, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) AmigaOS, AmigaOS 4; (2) FreeBSD, NetBSD, OpenBSD; (3) Linux; (4) Microsoft Windows; (5) OpenVMS; (6) OS X (Mac OS); (7) OS/2; (8) Solaris; (9) Tru64 UNIX; (10) VM; (11) Android; (12) Bada; (13) BlackBerry OS; (14) Firefox OS; (15) iOS; (16) Embedded Linux; (17) Palm OS; (18) Symbian; (19) Tizen; (20) WebOS; (21) Windows Mobile; (22) Windows Phone; (23) Adobe AIR; (24) Adobe Flash; (25) Adobe Shockwave; (26) Binary Runtime Environment for Wireless (BREW); (27) Cocoa (API); (28) Cocoa Touch; (29) Java Platforms; (30) JavaFX; (31) JavaFX Mobile; (32) Microsoft XNA; (33) Mono; (34) Mozilla Prism, XUL and XULRunner; (35) .NET Framework; (36) Silverlight; (37) Open Web Platform; (38) Oracle Database; (39) Qt; (40) SAP NetWeaver; (41) Smartface; (42) Vexi; and (43) Windows Runtime.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-10,000,000,000).

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the exemplary inventive computer-based systems/platforms, the exemplary inventive computer-based devices, and/or the exemplary inventive computer-based components of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIP-EMD-160, RTRO, SHA-1, SHA-2, Tiger (TTH), WHIRLPOOL, RNGs).

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

Figure 5:
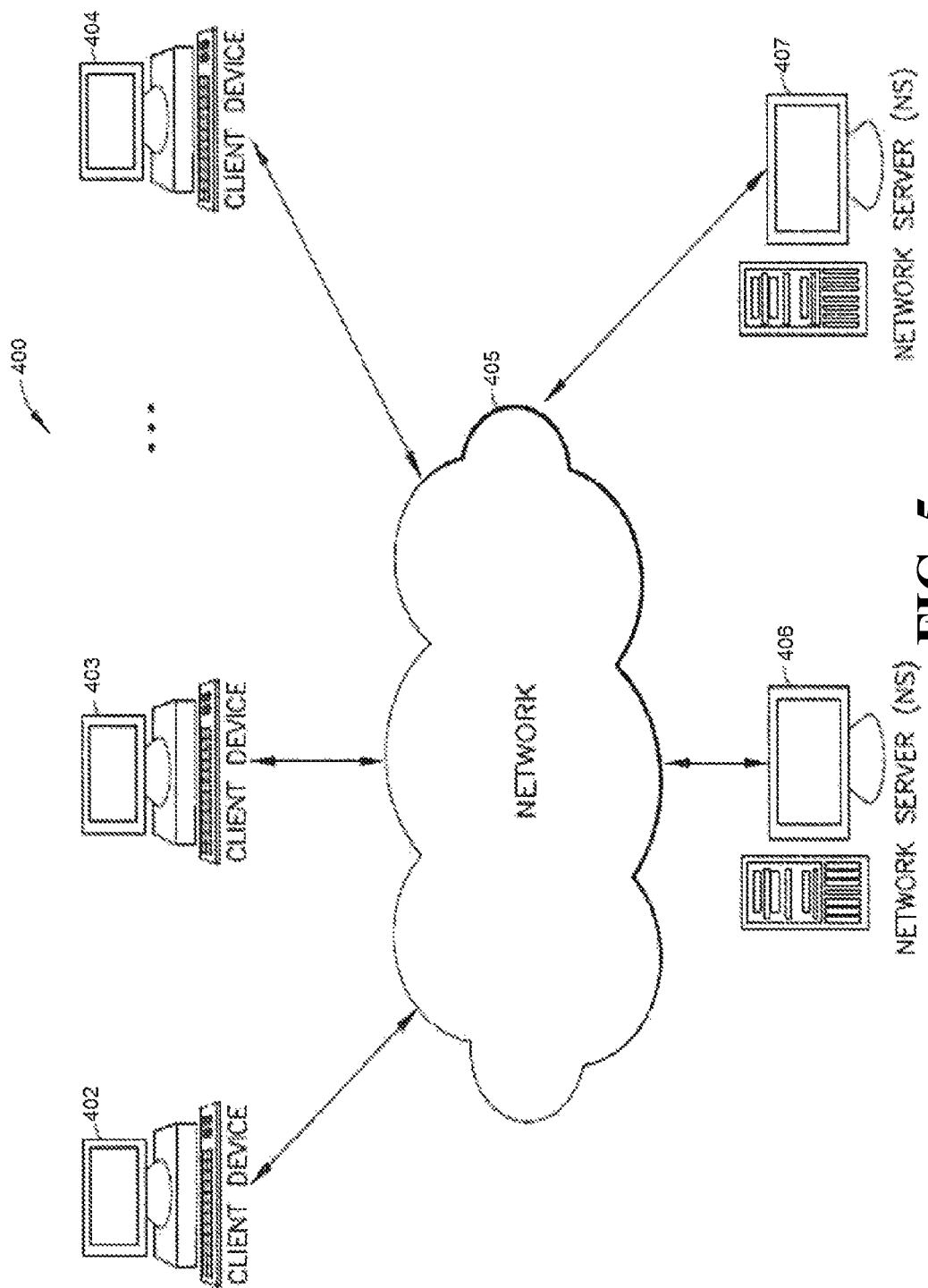
FIG. 5 depicts a block diagram of an exemplary computer-based system/platform in accordance with one or more embodiments of the present disclosure.

FIG. 5 depicts a block diagram of an exemplary computer-based system/platform 400 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 400 may be configured to manage a large number of members and/or concurrent transactions, as detailed herein. In some embodiments, the exemplary computer-based system/platform 400 may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 5, members 402-404 (e.g., clients) of the exemplary computer-based system/platform 400 may include virtually any computing device capable of receiving and sending a message over a network (e.g., cloud network), such as network 405, to and from another computing device, such as servers 406 and 407, each other, and the like. In some embodiments, the member devices 402-404 may be personal computers, multiprocessor systems, microprocessor-based or programmable consumer electronics, network PCs, and the like. In some embodiments, one or more member devices within member devices 402-404 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 402-404 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 402-404 may include may run one or more applications, such as Internet browsers, mobile applications, voice calls, video games, videoconferencing, and email, among others. In some embodiments, one or more member devices within member devices 402-404 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 402-404 may be specifically programmed by either Java, .Net, QT, C, C++ and/or other suitable programming language. In some embodiments, one or more member devices within member devices 402-404 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 405 may provide network access, data transport and/or other services to any computing device coupled to it. In some embodiments, the exemplary network 405 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 405 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 405 may include and implement, as an alternative or in conjunction with one or more of the above, a WiMAX architecture defined by the WiMAX forum. In some embodiments and, optionally, in combination of any embodiment described above or below, the exemplary network 405 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 405 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 405 may also include mass storage, such as network attached storage (NAS), a storage area network (SAN), a content delivery network (CDN) or other forms of computer or machine readable media.

In some embodiments, the exemplary server 406 or the exemplary server 407 may be a web server (or a series of servers) running a network operating system, examples of which may include but are not limited to Microsoft Windows Server, Novell NetWare, or Linux. In some embodiments, the exemplary server 406 or the exemplary server 407 may be used for and/or provide cloud and/or network computing. Although not shown in FIG. 6, in some embodiments, the exemplary server 406 or the exemplary server 407 may have connections to external systems like email, SMS messaging, text messaging, ad content providers, etc. Any of the features of the exemplary server 406 may be also implemented in the exemplary server 407 and vice versa.

In some embodiments, one or more of the exemplary servers 406 and 407 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 401-404.

In some embodiments and, optionally, in combination of any embodiment described above or below, for example, one or more exemplary computing member devices 402-404, the exemplary server 406, and/or the exemplary server 407 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 6:
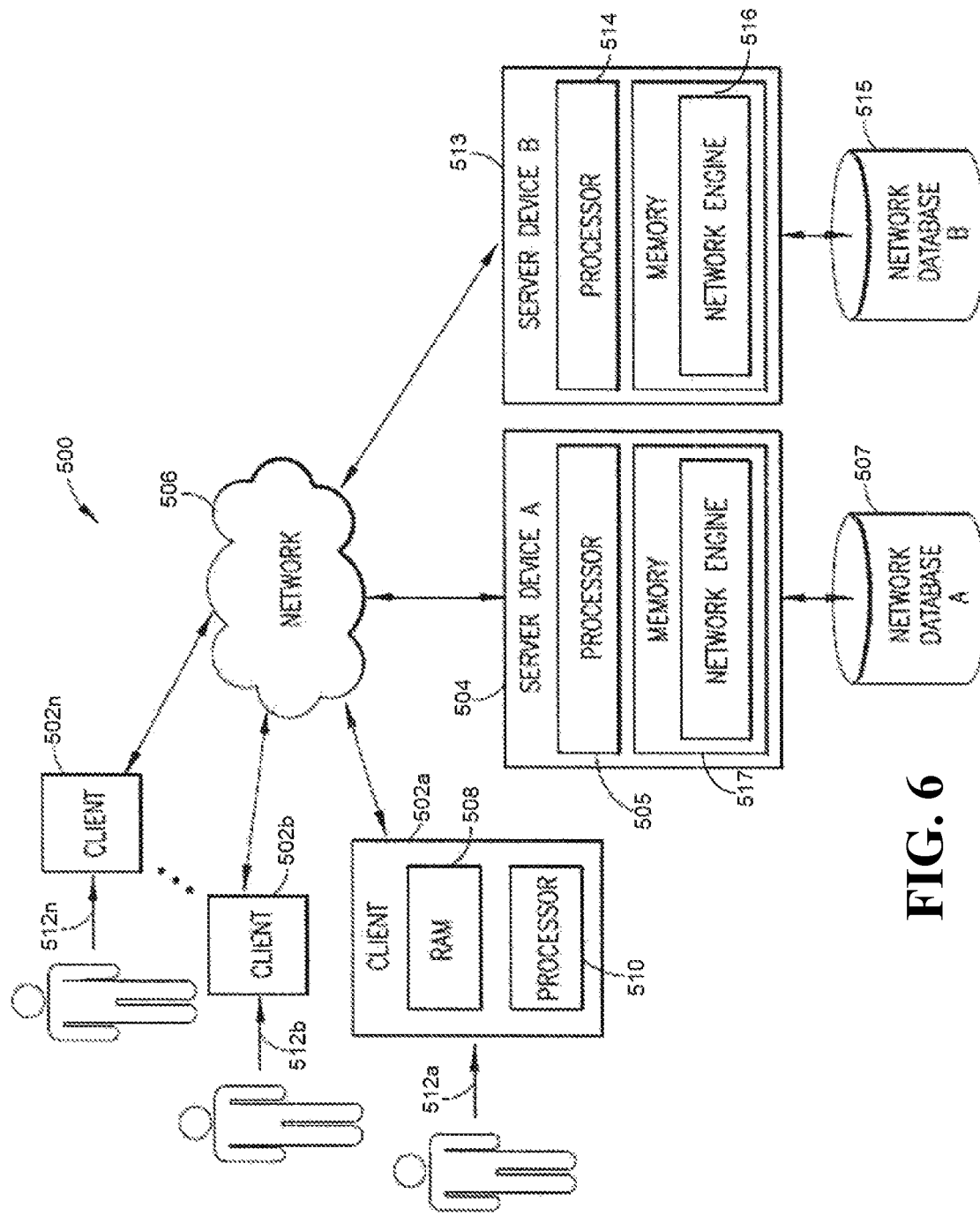
FIG. 6 depicts a block diagram of another exemplary computer-based system/platform in accordance with one or more embodiments of the present disclosure.

FIG. 6 depicts a block diagram of another exemplary computer-based system/platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 502a, 502b thru 502n shown each at least includes a computer-readable medium, such as a random-access memory (RAM) 508 coupled to a processor 510 or FLASH memory. In some embodiments, the processor 510 may execute computer-executable program instructions stored in memory 508. In some embodiments, the processor 510 may include a microprocessor, an ASIC, and/or a state machine. In some embodiments, the processor 510 may include, or may be in communication with, media, for example computer-readable media, which stores instructions that, when executed by the processor 510, may cause the processor 510 to perform one or more steps described herein. In some embodiments, examples of computer-readable media may include, but are not limited to, an electronic, optical, magnetic, or other storage or transmission device capable of providing a processor, such as the processor 510 of client 502a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 502a-n may also comprise a number of external or internal devices such as a mouse, a CD-ROM, DVD, a physical or virtual keyboard, a display, or other input or output devices (e.g., input/output devices 115 and 158). In some embodiments, examples of member computing devices 502a-n (e.g., clients) may be any type of processor-based platforms that are connected to a network 506 such as, without limitation, personal computers, digital assistants, personal digital assistants, smart phones, pagers, digital tablets, laptop computers, Internet appliances, and other processor-based devices. In some embodiments, member computing devices 502a-n may be specifically programmed with one or more application programs in accordance with one or more principles/methodologies detailed herein. In some embodiments, member computing devices 502a-n may operate on any operating system capable of supporting a browser or browser-enabled application, such as Microsoft™, Windows™, and/or Linux. In some embodiments, member computing devices 502a-n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 502a-n, users, 512a-n, may communicate over the exemplary network 506 with each other and/or with other systems and/or devices coupled to the network 506. As shown in FIG. 6, exemplary server devices 504 and 513 may be also coupled to the network 506. In some embodiments, one or more member computing devices 502a-n may be mobile clients.

In some embodiments, at least one database of exemplary databases 507 and 515 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 7:
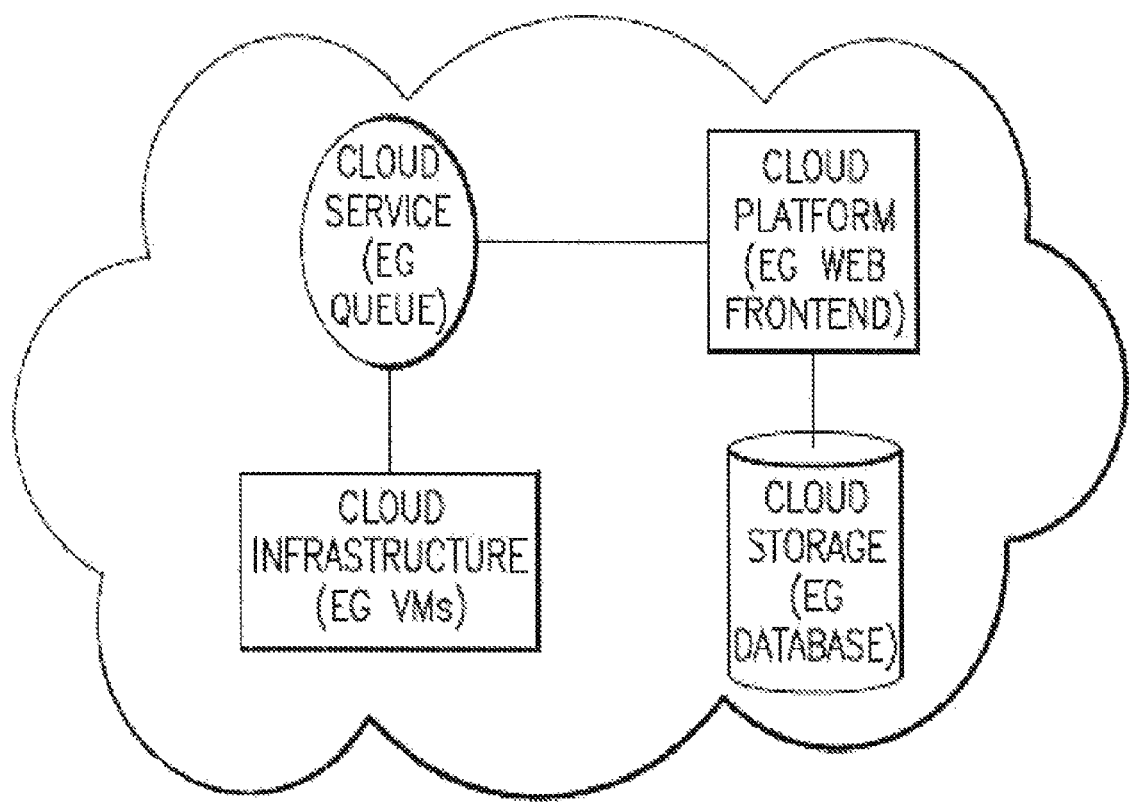
FIGS. 7 and 8 are diagrams illustrating implementations of cloud computing architecture/aspects with respect to which the disclosed technology may be specifically configured to operate, in accordance with one or more embodiments of the present disclosure.
Figure 8:
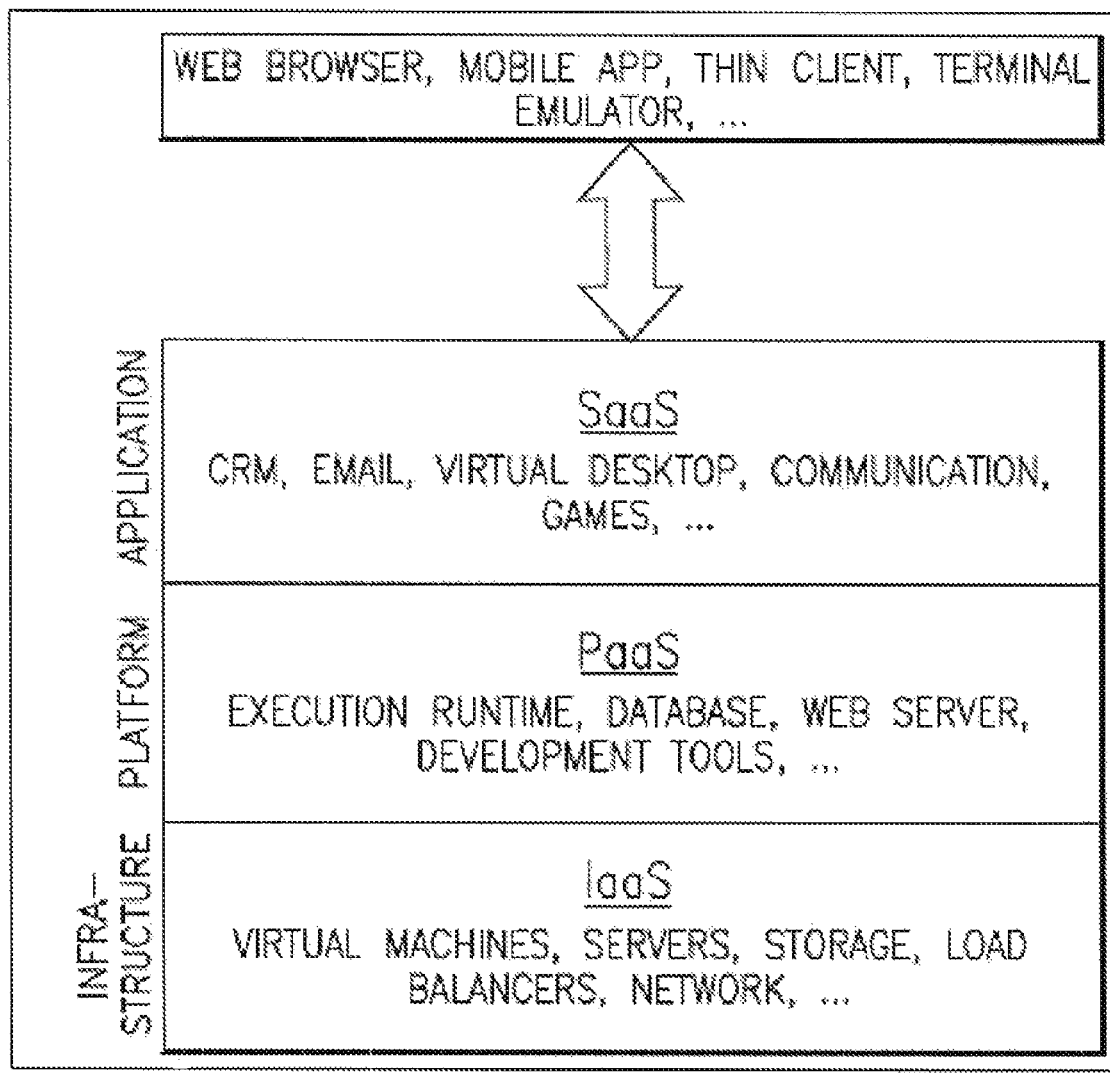

In some embodiments, the exemplary inventive computer-based systems/platforms, the exemplary inventive computer-based devices, and/or the exemplary inventive computer-based components of the present disclosure may be specifically configured to operate in an cloud computing/architecture such as, but not limiting to: infrastructure a service (IaaS), platform as a service (PaaS), and/or software as a service (SaaS). FIGS. 7 and 8 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

To prevent fraudulent use by fraudsters and/or thieves, financial institutions may block the payment card for use outside of a predefined area, such as an area around the home address on file of the account owner, for example, unless the payment card account owner calls into the financial institution issuing and/or managing the payment card to notify the financial institution of use outside of the predefined area (e.g., overseas). The embodiments of the present disclosure disclosed herein solve the technical problem by automatically updating the travel advisory set on the payment card account of the account owner based on receiving changes and/or updates to the flight reservation by the embodiments taught herein.

In some embodiments, travel advisory module 112 may detect that account owner 180 of payment card 185 may purchase airline tickets for other people using payment card 185, but account owner 180 is not one of the passengers. In this scenario, such a transaction may be attempted by a fraudster. In this case, travel advisory module 112 may request an authorization by the payment card account owner to apply the travel advisory to the payment card account. This request for authorization may include, for example, calling the owner by an agent of the financial institution, sending a request for the authorization by e-mail to an e-mail address of the owner, sending a request for authorization by an SMS message to a mobile device of the owner, and sending a request for authorization appearing in an application (e.g., a push notification) issued by the financial institution operating on a mobile device of the owner.

In some embodiments, the account owner of the payment card issued by the financial institution may purchase airline tickets or a travel reservation with other passengers also holding payment cards issued by the same financial institution. In this case, travel advisory module 112 may be configured to inform the other passengers of the upcoming travel and automatically apply the travel advisory to the payment cards issued by the same financial institution to the other passengers.

In some embodiments, the modified airline reservation information may include identifying a refund transaction in the account of the payment card (e.g., a partial or a full refund) due to a change or cancellation of the reservation.

Travel advisory module 112 is not limited to receiving the modified airline reservation information from the reservation system (e.g., server 140) and flight booking database. In some embodiments, secondary databases located on additional network servers such as servers 406 and 407 may be used to obtain the modified airline reservation information. For example, travel advisory module 112 may receive the modified airline reservation information by identifying the modified airline reservation information in an e-mail of at least one e-mail account (e.g., secondary database) of account owner 180 of payment card 185.

Figure 9:
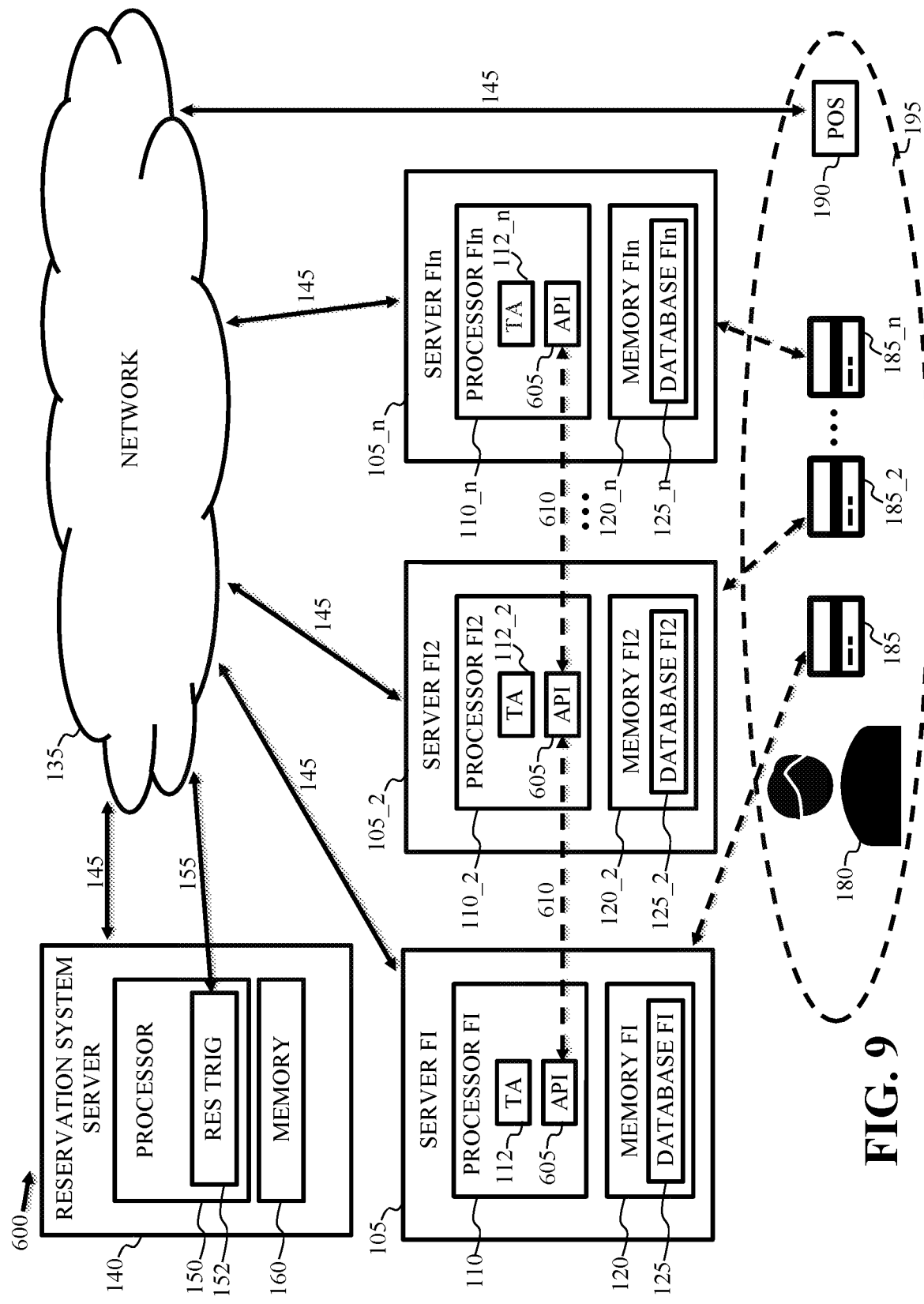
FIG. 9 depicts an exemplary system of multiple financial institutions sharing travel booking data, in accordance with one or more embodiments of the present disclosure.

FIG. 9 depicts an exemplary system 600 of multiple financial institutions (FI1, FI2, . . . FIn) sharing travel booking data, in accordance with one or more embodiments of the present disclosure. First financial institution FI1 with server 105 from FIG. 1 now communicates 145 with n servers of other multiple financial institutions (FI2 . . . FIn) denoted 105_2, . . . 105_*n* over communication network 135, where n is an integer. The other financial institution (FI) servers may include other (secondary) databases 125_2, . . . and 125_*n* with records holding information about payment cards 185_2 . . . 185_*n* issued by the other financial institutions and respectively managed by FI servers 105_2 . . . 105_*n*.

In some embodiments, the other financial institutions may participate in data sharing agreements with first financial institution FI1 issuing payment card 185. An API 605 running on processors 110, 110_2 . . . 110_*n*, or any suitable software routine or module, may be used to relay 610 airline reservation information and/or modified airline reservation information between each of the different servers in system 600 of the participating financial institutions either from the purchase transaction registered in the payment card account of payment cards 185, 185_2 . . . 185_*n* or from airline reservation information and/or modified airline reservation information received by any server 105, 105_2, . . . 105_*n* from reservation system server 140.

In some embodiments, travel advisory module 112 running on FI server 105 may receive airline reservation information and/or modified airline reservation information from a second financial institution from any of the other financial institutions when account owner 180 uses a second payment card from any one of payment cards 185_2 . . . 185_*n* issued by the second financial institution to purchase the airline ticket. In other embodiments, travel advisory module 112 may set a travel advisory or updated travel advisory on payment card 185 in accordance with the received airline reservation information and/or modified airline reservation information over communication network 135 from the second financial institution.

In other embodiments, processor 110 may be configured to relay the modified airline reservation information to the other financial institutions for setting travel advisories on each of the other payment cards issued to account owner 180 by the other financial institutions.

In some embodiments, a method may include:

receiving, by at least one processor associated with a financial institution, a purchase transaction information of a purchase of at least one airline ticket from a flight booking database, where the purchase transaction information may be associated with an account of a payment card issued by a financial institution, where the purchase transaction information may include airline reservation information for a first departure-destination location pair;

where the airline reservation information may include at least one passenger name, a first departure location, a first destination location, and a first departure date;

automatically applying, by the at least one processor, a travel advisory to the account of the payment card based on the first destination location and the first departure date, where the travel advisory may authorize a use of the payment card at the first destination location;

causing, by the at least one processor, to establish an airline reservation modification trigger event in the flight booking database;

where the airline reservation modification trigger event may be configured to cause the flight booking database to send modified airline reservation information to the at least one processor associated with the financial institution;

where the modified airline reservation information may include at least one of:

i) a second departure location that is distinct from the first departure location, ii) a second destination location that is distinct from the first destination location, and iii) a second departure date that is distinct from the first departure date;

receiving, by the at least processor, the modified airline reservation information from the flight booking database when the airline reservation information was modified; and updating, by the at least one processor, the travel advisory for the account of the payment card issued by the financial institution in accordance with the modified airline reservation information.

In some embodiments, the payment card may be a credit card or a debit card.

In some embodiments, the method may include requesting, by the at least one processor, an authorization by an owner of the payment card account to apply the travel advisory to the payment card account when the at least one passenger is not the owner of the payment card account.

In some embodiments, requesting the authorization may be selected from the group consisting of requesting authorization by an agent of the financial institution calling the owner, sending a request for the authorization by e-mail to an e-mail address of the owner, sending a request for authorization by an SMS message to a mobile device of the owner, and sending a request for authorization appearing in an application issued by the financial institution operating on a mobile device of the owner.

In some embodiments, the method may include informing, by the at least one processor, other payment card account owners having payment cards issued by the financial institution, where the other payment card account owners have names identified in the purchase transaction information as other passenger names from the at least one passenger name.

In some embodiments, the method may include automatically applying, by the at least one processor, the travel advisory to the payment cards of the other payment card account owners.

In some embodiments, receiving the modified airline reservation information may include identifying the modified airline reservation information in an e-mail of at least one e-mail account of an owner of the account of the payment card.

In some embodiments, receiving the modified airline reservation information may include identifying a refund transaction with the modified airline reservation information in the account of the payment card.

In some embodiments, receiving the modified airline reservation information may include receiving the modified airline reservation information from a second financial institution when an owner of the payment card in the financial institution uses a second payment card issued by the second financial institution to purchase the at least one airline ticket.

In some embodiments, accounts of other payment cards issued by other financial institutions may be owned by an owner of the payment card account in the financial institution, and the method may include relaying, by the at least one processor, the modified airline reservation information to the other financial institutions.

In some embodiments, a system may include a memory and at least one processor. The at least one processor may be configured to:

receive a purchase transaction information of a purchase of at least one airline ticket from a flight booking database;

where the purchase transaction information may be associated with an account of a payment card issued by a financial institution, where the purchase transaction information may include airline reservation information for a first departure-destination location pair;

where the airline reservation information may include at least one passenger name, a first departure location, a first destination location, and a first departure date;

automatically apply a travel advisory to the account of the payment card based on the first destination location and the first departure date, where the travel advisory may authorize a use of the payment card at the first destination location;

cause to establish an airline reservation modification trigger event in the flight booking database;

where the airline reservation modification trigger event may be configured to cause the flight booking database to send modified airline reservation information to the at least one processor associated with the financial institution;

where the modified airline reservation information may include at least one of:

i) a second departure location that is distinct from the first departure location, ii) a second destination location that is distinct from the first destination location, and iii) a second departure date that is distinct from the first departure date;

receive the modified airline reservation information from the flight booking database when the airline reservation information was modified; and update the travel advisory for the account of the payment card issued by the financial institution in accordance with the modified airline reservation information.

In some embodiments, the payment card may be a credit card or a debit card.

In some embodiments, the at least one processor may be further configured to request an authorization by an owner of the payment card account to apply the travel advisory to the payment card account when the at least one passenger is not the owner of the payment card account;

In some embodiments, the at least one processor may be further configured to request the authorization, selected from the group consisting of: requesting authorization by an agent of the financial institution calling the owner, sending a request for the authorization by e-mail to an e-mail address of the owner, sending a request for authorization by an SMS message to a mobile device of the owner, and sending a request for authorization appearing in an application issued by the financial institution operating on a mobile device of the owner.

In some embodiments, the at least one processor may be further configured to inform other payment card account owners having payment cards issued by the financial institution, wherein the other payment card account owners have names identified in the purchase transaction information as other passenger names from the at least one passenger name.

In some embodiments, the at least one processor may be further configured to automatically apply the travel advisory to the payment cards of the other payment card account owners.

In some embodiments, the at least one processor may be configured to receive the modified airline reservation information by identifying the modified airline reservation information in an e-mail of at least one e-mail account of an owner of the account of the payment card.

In some embodiments, the at least one processor may be configured to receive the modified airline reservation information by identifying a refund transaction with the modified airline reservation information in the account of the payment card.

In some embodiments, the at least one processor may be configured to receive the modified airline reservation information by receiving the modified airline reservation information from a second financial institution when an owner of the payment card in the financial institution uses a second payment card issued by the second financial institution to purchase the at least one airline ticket.

In some embodiments, accounts of other payment cards issued by other financial institutions are owned by an owner of the payment card account in the financial institution, and the at least one processor may be further configured to relay the modified airline reservation information to the other financial institutions.

In some embodiments, the travel advisory may not be limited to detecting new and/or updates to flight information, but may include any travel reservation paid with payment card 185, such as booking a cruise, and/or booking car rentals, and/or booking a hotel in a location outside of a predefined home location of the account owner.

Thus, in some embodiments, a system may include a memory and at least one processor. The at least one processor may be configured to:

receive a purchase transaction information of a purchase of at least one travel reservation from a travel booking database;

where the purchase transaction information may be associated with an account of a payment card issued by a financial institution, where the purchase transaction information may include travel reservation information;

where the travel reservation information may include at least one traveler name, a first departure location, a first destination location, and a first departure date;

automatically apply a travel advisory to the account of the payment card based on the first destination location and the first departure date, where the travel advisory may authorize a use of the payment card at the first destination location;

cause to establish a travel reservation modification trigger event in the travel booking database;

where the travel reservation modification trigger event may be configured to cause the travel booking database to send modified travel reservation information to the at least one processor associated with the financial institution;

where the modified travel reservation information may include at least one of:

i) a second departure location that is distinct from the first departure location, ii) a second destination location that is distinct from the first destination location, and iii) a second departure date that is distinct from the first departure date;

receive the modified travel reservation information from the flight booking database when the travel reservation information was modified; and update the travel advisory for the account of the payment card issued by the financial institution in accordance with the modified travel reservation information.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

The invention claimed is:

1. A method comprising:
receiving, by at least one processor of at least one server associated with a financial institution, over a communication network, a purchase transaction data of a purchase of at least one airline ticket from a flight reservation server using a payment card issued by the financial institution;
storing, by the at least one processor, the purchase transaction data in at least one account data record associated with an account of the payment card on at least one account database in the at least one server;
wherein the purchase transaction data of the at least one airline ticket comprises airline reservation data with at least one passenger name, a first departure location, a first destination location, and a first departure date;
automatically adding, by the at least one processor, a travel advisory event to the account of the payment card based on the first destination location and the first departure date in the at least one account data record;
wherein the travel advisory event causes a point-of-sale (POS) device located at a destination location stored in the at least one account data record to accept the payment card;
transmitting, by the at least one processor, in response to setting the travel advisory event, over the communication network, an airline reservation modification trigger event instruction to the flight reservation server;
wherein the airline reservation modification trigger event instruction is configured to program the flight reservation server to remotely execute an airline reservation modification trigger application programming interface (API) upon detecting an airline modification event in the airline reservation data;
wherein the airline reservation modification trigger API:
(i) automatically identifies modified airline reservation data stored in at least one flight booking data record from a plurality of flight booking data records in a flight booking database of the flight reservation server; and
(ii) automatically sends the modified airline reservation data over the communication network to the at least one server;
receiving, by the at least one processor, over the communication network, via the airline reservation modification trigger API, from the flight reservation server, the modified airline reservation data when the airline reservation data is modified;
wherein the modified airline reservation data comprises at least one of:

i) a second departure location that is distinct from the first departure location,
ii) a second destination location that is distinct from the first destination location, and
iii) a second departure date that is distinct from the first departure date;
updating, by the at least one processor, the travel advisory event in the at least one account data record with the modified airline reservation data;
receiving, by the at least one processor, over the communication network, a payment authorization request from a point-of-sale (POS) device at the second destination location to accept the payment card in at least one purchase transaction;
determining, by the at least one processor, when the modified airline reservation data comprises an indication of the second destination location; and
transmitting, by the at least one processor, when the modified airline reservation data comprises the indication of the second destination location, over the communication network, a payment authorization instruction to the POS device at the second destination location to accept the payment card.

2. The method according to claim 1, further comprising requesting, by the at least one processor, an authorization by an owner of the account to apply the travel advisory event to the account when the at least one passenger name is not a name of the owner of the account.

3. The method according to claim 2, requesting the authorization is selected from the group consisting of requesting authorization by an agent of the financial institution calling the owner, sending a request for the authorization by e-mail to an e-mail address of the owner, sending a request for authorization by an SMS message to a mobile device of the owner, and sending a request for authorization appearing in an application issued by the financial institution operating on a mobile device of the owner.

4. The method according to claim 1, further comprising informing, by the at least one processor, other payment card account owners having payment cards issued by the financial institution, wherein the other payment card account owners have names identified in the purchase transaction data as other passenger names from the at least one passenger name.

5. The method according to claim 4, further comprising automatically applying, by the at least one processor, the travel advisory event to the payment cards of the other payment card account owners.

6. The method according to claim 1, wherein receiving the modified airline reservation data comprises identifying the modified airline reservation data in an e-mail of at least one e-mail account of an owner of the account of the payment card.

7. The method according to claim 1, wherein receiving the modified airline reservation data comprises identifying a refund transaction with the modified airline reservation data in the account of the payment card.

8. The method according to claim 1, wherein receiving the modified airline reservation data comprises receiving the modified airline reservation data from a second financial institution when an owner of the payment card in the financial institution uses a second payment card issued by the second financial institution to purchase the at least one airline ticket.

9. The method according to claim 1, wherein accounts of other payment cards issued by other financial institutions are owned by an owner of the account in the financial institution, and further comprising relaying, by the at least one processor, the modified airline reservation data to the other financial institutions.

10. A system, comprising:
a memory; and
at least one processor of at least one server communicating over a communication network and associated with a financial institution configured to:
   receive a purchase transaction data of a purchase of at least one airline ticket from a flight reservation server using a payment card issued by the financial institution;
   store the purchase transaction data in at least one account data record associated with an account of the payment card on at least one account database in the at least one server;
   wherein the purchase transaction data of the at least one airline ticket comprises airline reservation data with at least one passenger name, a first departure location, a first destination location, and a first departure date;
   automatically add a travel advisory event to the account of the payment card based on the first destination location and the first departure date in the at least one account data record;
   wherein the travel advisory event causes a point-of-sale (POS) device located at a destination location stored in the at least one account data record to accept the payment card;
   transmit, in response to setting the travel advisory event, over the communication network, an airline reservation modification trigger event instruction to the flight reservation server;
   wherein the airline reservation modification trigger event instruction is configured to program the flight reservation server to remotely execute an airline reservation modification trigger application programming interface (API) upon detecting an airline modification event in the airline reservation data;
   wherein the airline reservation modification trigger API:
      (i) automatically identifies modified airline reservation data stored in at least one flight booking data record from a plurality of flight booking data records in a flight booking database of the flight reservation server; and
      (ii) automatically sends the modified airline reservation data over the communication network to the at least one server;
   receive, over the communication network, via the airline reservation modification trigger API, from the flight reservation server, the modified airline reservation data when the airline reservation data is modified;
   wherein the modified airline reservation data comprises at least one of:
      i) a second departure location that is distinct from the first departure location,
      ii) a second destination location that is distinct from the first destination location, and
      iii) a second departure date that is distinct from the first departure date;
   update the travel advisory event in the at least one account data record with the modified airline reservation data;
   receive, over the communication network, a payment authorization request from a point-of-sale (POS) device at the second destination location to accept the payment card in at least one purchase transaction;
   determine when the modified airline reservation data comprises an indication of the second destination location; and
   transmit, when the modified airline reservation data comprises the indication of the second destination location, over the communication network, a payment authorization instruction to the POS device at the second destination location to accept the payment card.

11. The system according to claim 10, wherein the at least one processor is further configured to request an authorization by an owner of the account to apply the travel advisory event to the account when the at least one passenger name is not a name of the owner of the account.

12. The system according to claim 11, wherein the at least one processor is further configured to request the authorization, selected from the group consisting of: requesting authorization by an agent of the financial institution calling the owner, sending a request for the authorization by e-mail to an e-mail address of the owner, sending a request for authorization by an SMS message to a mobile device of the owner, and sending a request for authorization appearing in an application issued by the financial institution operating on a mobile device of the owner.

13. The system according to claim 10, wherein the at least one processor is further configured to inform other payment card account owners having payment cards issued by the financial institution, wherein the other payment card account owners have names identified in the purchase transaction data as other passenger names from the at least one passenger name.

14. The system according to claim 13, wherein the at least one processor is further configured to automatically apply the travel advisory event to the payment cards of the other payment card account owners.

15. The system according to claim 10, wherein the at least one processor is configured to receive the modified airline reservation data by identifying the modified airline reservation data in an e-mail of at least one e-mail account of an owner of the account of the payment card.

16. The system according to claim 10, wherein the at least one processor is configured to receive the modified airline reservation data by identifying a refund transaction with the modified airline reservation data in the account of the payment card.

17. The system according to claim 10, wherein the at least one processor is configured to receive the modified airline reservation data by receiving the modified airline reservation data from a second financial institution when an owner of the payment card in the financial institution uses a second payment card issued by the second financial institution to purchase the at least one airline ticket.

18. The system according to claim 10, wherein accounts of other payment cards issued by other financial institutions are owned by an owner of the account in the financial institution, and wherein the at least one processor is further configured to relay the modified airline reservation data to the other financial institutions.

19. The method according to claim 1, further comprising transmitting, by the at least one processor, over the communication network, the airline reservation data, the modified airline reservation data, or both, to at least one other database on at least one other server associated with at least one other financial institution that is different from the financial institution.

20. The system according to claim 10, wherein the at least one processor is further configured to transmit, over the communication network, the airline reservation data, the modified airline reservation data, or both, to at least one other database on at least one other server associated with at least one other financial institution that is different from the financial institution.

\* \* \* \* \*